(12) United States Patent
Chai et al.

(10) Patent No.: US 11,213,743 B2
(45) Date of Patent: Jan. 4, 2022

(54) METHOD, SYSTEM AND ELECTRONIC DEVICE FOR ACHIEVING REMOTE CONTROL OF COMPUTER GAME BY GAME CONTROLLER

(71) Applicant: Shanghai Dalong Technology Co., Ltd., Shanghai (CN)

(72) Inventors: Yilei Chai, Shanghai (CN); Xuyang Lin, Shanghai (CN); Shuying Liu, Shanghai (CN); Meilong Yao, Shanghai (CN)

(73) Assignee: Shanghai Dalong Technology Co., Ltd., Shanghai (CN)

( * ) Notice: Subject to any disclaimer, the term of this patent is extended or adjusted under 35 U.S.C. 154(b) by 0 days.

(21) Appl. No.: 16/632,388

(22) PCT Filed: Aug. 22, 2019

(86) PCT No.: PCT/CN2019/101986
§ 371 (c)(1),
(2) Date: Mar. 4, 2020

(87) PCT Pub. No.: WO2020/114007
PCT Pub. Date: Jun. 11, 2020

(65) Prior Publication Data
US 2021/0291045 A1    Sep. 23, 2021

(30) Foreign Application Priority Data

Dec. 7, 2018    (CN) .......................... 201811497509.6

(51) Int. Cl.
*A63F 13/22*    (2014.01)
*A63F 13/42*    (2014.01)
*A63F 13/33*    (2014.01)
*A63F 13/92*    (2014.01)

(52) U.S. Cl.
CPC .............. *A63F 13/33* (2014.09); *A63F 13/22* (2014.09); *A63F 13/42* (2014.09); *A63F 13/92* (2014.09)

(58) Field of Classification Search
None
See application file for complete search history.

(56) References Cited

U.S. PATENT DOCUMENTS

| | | | |
|---|---|---|---|
| 2010/0269135 A1* | 10/2010 | Hulse | H04N 21/254 725/37 |
| 2011/0195790 A1* | 8/2011 | Konkle | A63F 13/79 463/42 |
| 2013/0065692 A1* | 3/2013 | Aronzon | A63F 13/87 463/42 |

* cited by examiner

*Primary Examiner* — Damon J Pierce

(57) ABSTRACT

The present disclosure provides a method for remote control of computer game by a gamepad, including: remotely accessing, by the client-side, the virtual cloud desktop provided by the server-side, and sending message to the server-side when detecting gamepads; creating or enabling by the virtual cloud desktop server-side, a corresponding number of virtual game devices; capturing, by the client-side, the operation instruction data of the gamepads, and sending the operation instruction data to the server-side; causing each virtual game device to output a KeyCode value corresponding to each operation instruction data by the server-side, such that the virtual cloud desktop server runs the computer game according to each KeyCode value and the relative movement value of the joystick; sending the data of the running results of the computer game on the virtual cloud desktop to the client-side for display.

12 Claims, 3 Drawing Sheets

METHOD, SYSTEM AND ELECTRONIC DEVICE FOR ACHIEVING REMOTE CONTROL OF COMPUTER GAME BY GAME CONTROLLER

CROSS REFERENCES TO RELATED APPLICATIONS

This is a Sect. 371 National Stage application of a PCT International Application No. PCT/CN2019/101986, filed on Aug. 22, 2019, which claims priority of a Chinese Patent Applications No. 2018114975096, filed on Dec. 7, 2018, the content of which is hereby incorporated by reference in its entirety for all purposes.

TECHNICAL FIELD

The present disclosure relates to the technical field of computer software, and in particular, to a method, system and electronic device for remote control of computer games by a gamepad.

BACKGROUND

Along with the rapid development of smart mobile devices in the current society, electronic products such as mobile phones, tablet computers, and smart wearable devices are popularizing in public life. People can use smart mobile devices for shopping, reading, and entertainment, etc. As a result, the functions of smart mobile devices are continuously innovated and improved, and various functions of the PC are gradually realized.

At present, various mobile games appear on the market. Compared with the hardware on which computer games are played, smart mobile devices have less storage space, and the operating speed of computing chips is significantly slower. This determines that mobile games would face a relative shortage of space resources. In addition, some computer game makers are not planning to release mobile version of the games, which means players cannot use smart mobile devices to play such games.

In order to make up for the shortage that the users of smart mobile devices cannot operate the computer games, technical solutions for controlling PCs using smart mobile devices have emerged in the industry. However, in the conventional technology, due to the technical barriers, smart mobile device users can only control the games on the PC using the keyboard and mouse connected to the smart mobile device as input devices, instead of using a game controller. For smart mobile device users who like to play games with a gamepad, the conventional technology may not provide a good game experience.

SUMMARY

The present disclosure provide a method, system and electronic device for remote control of computer game by a gamepad. The present disclosure solves the problem that the user cannot use a gamepad to remotely control computer games on smart terminals.

The present disclosure provides a method for remote control of computer game by a gamepad, including: remotely connecting a client-side for remote connection of a mobile terminal with a virtual cloud desktop server-side of a virtual cloud desktop server, so as to remotely access a virtual cloud desktop provided by the virtual cloud desktop server-side; the virtual cloud desktop includes a display window of a computer game; detecting, by the client-side for remote connection, whether a gamepad is connected with the mobile terminal; if yes, the client-side for remote connection sends a message to the virtual cloud desktop server-side; the message includes the number of connected gamepads; when receiving the message, creating or enabling by the virtual cloud desktop server-side, a corresponding number of virtual game devices; the virtual game device stores a one-to-one corresponding relationship between the button operation instructions of the physical gamepads and the KeyCode values of the operating system of the virtual cloud desktop server, and a one-to-one corresponding relationship between the joystick operation instructions of the physical gamepads and the KeyCode values of the operating system of the virtual cloud desktop server; capturing, by the client-side for remote connection, the operation instruction data of each of the gamepads, and sending the operation instruction data to the virtual cloud desktop server-side; the operation instruction data includes the identity of the gamepads, the button operation instruction data and the joystick operation instruction data; receiving, by the virtual cloud desktop server-side, the operation instruction data, and causing each virtual game device to output a KeyCode value corresponding to each button operation instruction and each joystick operation instruction according to the corresponding relationship, such that the virtual cloud desktop server runs the computer game according to each KeyCode value and the relative movement value of the joystick in the joystick operation instruction data; sending, by the virtual cloud desktop server-side, data of the running results of the computer game on the virtual cloud desktop to the client-side for remote connection; receiving the data by the client-side for remote connection, and displaying the data on the mobile terminal.

In an embodiment of the present disclosure, the virtual cloud desktop server-side creating a corresponding number of virtual game devices when receiving the message includes: the virtual cloud desktop server-side creates and enables a corresponding number of virtual game devices in an operating system of the virtual cloud desktop server.

In an embodiment of the present disclosure, the virtual cloud desktop server-side enabling a corresponding number of virtual game devices when receiving the message includes: pre-creating a plurality of virtual game devices by the virtual cloud desktop server-side in the virtual desktop infrastructure (VDI) layer of the virtual cloud desktop server, and setting the virtual game devices to be disabled; after receiving the message, enabling, by the virtual cloud desktop server-side, a corresponding number of virtual game devices according to the number of connected gamepads.

In an embodiment of the present disclosure, the method further includes: after capturing the operation instruction data of each gamepad, converting, by the client-side for the remote connection, the operation instruction data into the data in the format required by the virtual cloud desktop server-side, and packaging and sending the converted data to the virtual cloud desktop server-side; receiving and parsing, by the virtual cloud desktop server-side, a data packet sent by the client-side for remote connection, and sending the parse result to each of the virtual game devices that are created or enabled.

In an embodiment of the present disclosure, the client-side for remote connection sends the captured operation instruction data of each of the gamepads to the virtual cloud desktop server-side via a wide area network.

The present disclosure provides a system for remote control of computer game by a gamepad, including: a mobile terminal having a client-side for remote connection, a virtual cloud desktop server having a virtual cloud desktop server-side, and at least one gamepad; the client-side for remote connection is remotely connected with the virtual cloud desktop server-side, so as to remotely access a virtual cloud desktop provided by the virtual cloud desktop server-side, wherein the virtual cloud desktop includes a display window of a computer game; the client-side for remote connection detects whether a gamepad is connected with the mobile terminal, if yes, sends a message to the virtual cloud desktop server-side, the message includes the number of connected gamepads; the client-side for remote connection captures the operation instruction data of the gamepad, and sends them to the virtual cloud desktop server-side, wherein the operation instruction data includes the identity of the gamepads, the button operation instruction data and the joystick operation instruction data; the virtual cloud desktop server-side creates or enables a corresponding number of virtual game devices when receiving the message, the virtual game device stores a one-to-one corresponding relationship between the button operation instructions of the physical gamepads and the KeyCode values of the operating system of the virtual cloud desktop server, and a one-to-one corresponding relationship between the joystick operation instructions of the physical gamepads and the KeyCode values of the operating system of the virtual cloud desktop server; when receiving the operation instruction data, the virtual cloud desktop server-side causes each virtual game device to output a KeyCode value corresponding to each button operation instruction and each joystick operation instruction according to the corresponding relationship, such that the virtual cloud desktop server operates the computer game according to each KeyCode value and the relative movement value of the joystick in the joystick operation instruction data; the virtual cloud desktop server-side sends the data of the running results of the computer game on the virtual cloud desktop to the client-side for remote connection, such that the client-side for remote connection receives the data and displays them on the mobile terminal.

The present disclosure provides a method for remote control of computer game by a gamepad, applied to a virtual cloud desktop server-side. The method includes: when receiving a remote access request from a client-side, providing a virtual cloud desktop to the client-side, the virtual cloud desktop includes a display window of a computer game; when receiving a message containing the number of connected gamepads sent by the client-side, creating or enabling a corresponding number of virtual game devices, wherein the virtual game device stores a one-to-one corresponding relationship between the button operation instructions of the physical gamepads and the KeyCode values of the operating system of the virtual cloud desktop server, and a one-to-one corresponding relationship between the joystick operation instructions of the physical gamepads and the KeyCode values of the operating system of the virtual cloud desktop server; when receiving the operation instruction data of each gamepad captured and sent by the client-side, causing each virtual game device to output a KeyCode value corresponding to each button operation instruction and each joystick operation instruction according to the corresponding relationship, such that the virtual cloud desktop server runs the computer game according to each KeyCode value and the relative movement value of the joystick in the joystick operation instruction data; sending the data of the running results of the computer game on the virtual cloud desktop to the client-side, such that the client-side receives the data and displays them.

In an embodiment of the present disclosure, the virtual cloud desktop server-side creating a corresponding number of virtual game devices when receiving the message includes: the virtual cloud desktop server-side creates and enables a corresponding number of virtual game devices in an operating system of the virtual cloud desktop server. The virtual cloud desktop server-side enabling a corresponding number of virtual game devices when receiving the message includes: pre-creating, by the virtual cloud desktop server-side, a plurality of virtual game devices in the virtual desktop infrastructure (VDI) layer of the virtual cloud desktop server, and setting them to be disabled; after receiving the message, enabling, by the virtual cloud desktop server-side, a corresponding number of virtual game devices according to the number of connected gamepads.

The present disclosure provides a storage medium storing a computer program. When the computer program is executed by a processor, the method for remote control of computer game by a gamepad is realized.

The present disclosure provides an electronic device, including: a processor and a storage; wherein the storage stores a computer program; the processor executes the computer program, such that the electronic device executes the method for remote control of computer game by a gamepad.

As mentioned above, the present disclosure provides a method, system and electronic device for remote control of computer game by a gamepad, the client-side remotely accesses the virtual cloud desktop provided by the server-side and sends message to the server-side when detecting gamepads; the server-side creates or enables a corresponding number of virtual game devices, wherein the virtual game device stores a one-to-one corresponding relationship between the button operation instructions of the physical gamepads and the KeyCode values of the operating system of the virtual cloud desktop server, and a one-to-one corresponding relationship between the joystick operation instructions of the physical gamepads and the KeyCode values of the operating system of the virtual cloud desktop server; the client-side captures the operation instruction data of the gamepads and sends them to the server-side; the server-side makes each virtual game device to output a KeyCode value corresponding to each button operation instruction and each joystick operation instruction according to the corresponding relationship, such that the virtual cloud desktop server operates the computer game according to each KeyCode value and the relative movement value of the joystick in the joystick operation instruction data; and, the server-side sends the data of the running results of the computer game on the virtual cloud desktop to the client-side for display.

The technical solution of the present disclosure makes up the shortage of the peripheral I/O device in the existing technology. Users can remotely control gamepad-supporting computer games in the virtual cloud desktop by using a gamepad, thereby increasing the game manipulation modes, reducing the game operation limit, and improving the game playing fluency and operation experience.

DETAILED DESCRIPTION OF THE PREFERRED EMBODIMENTS

The embodiments of the present disclosure will be described below through exemplary embodiments. Those skilled in the art can easily understand other advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure. It needs to be stated that the following embodiments and the features in the embodiments can be combined with one another under the situation of no conflict.

It needs to be stated that the drawings provided in the following embodiments are just used for schematically describing the basic concept of the present disclosure, thus only illustrating components only related to the present disclosure and are not drawn according to the numbers, shapes and sizes of components during actual implementation, the configuration, number and scale of each component during actual implementation thereof may be freely changed, and the component layout configuration thereof may be more complex.

Figure 1:
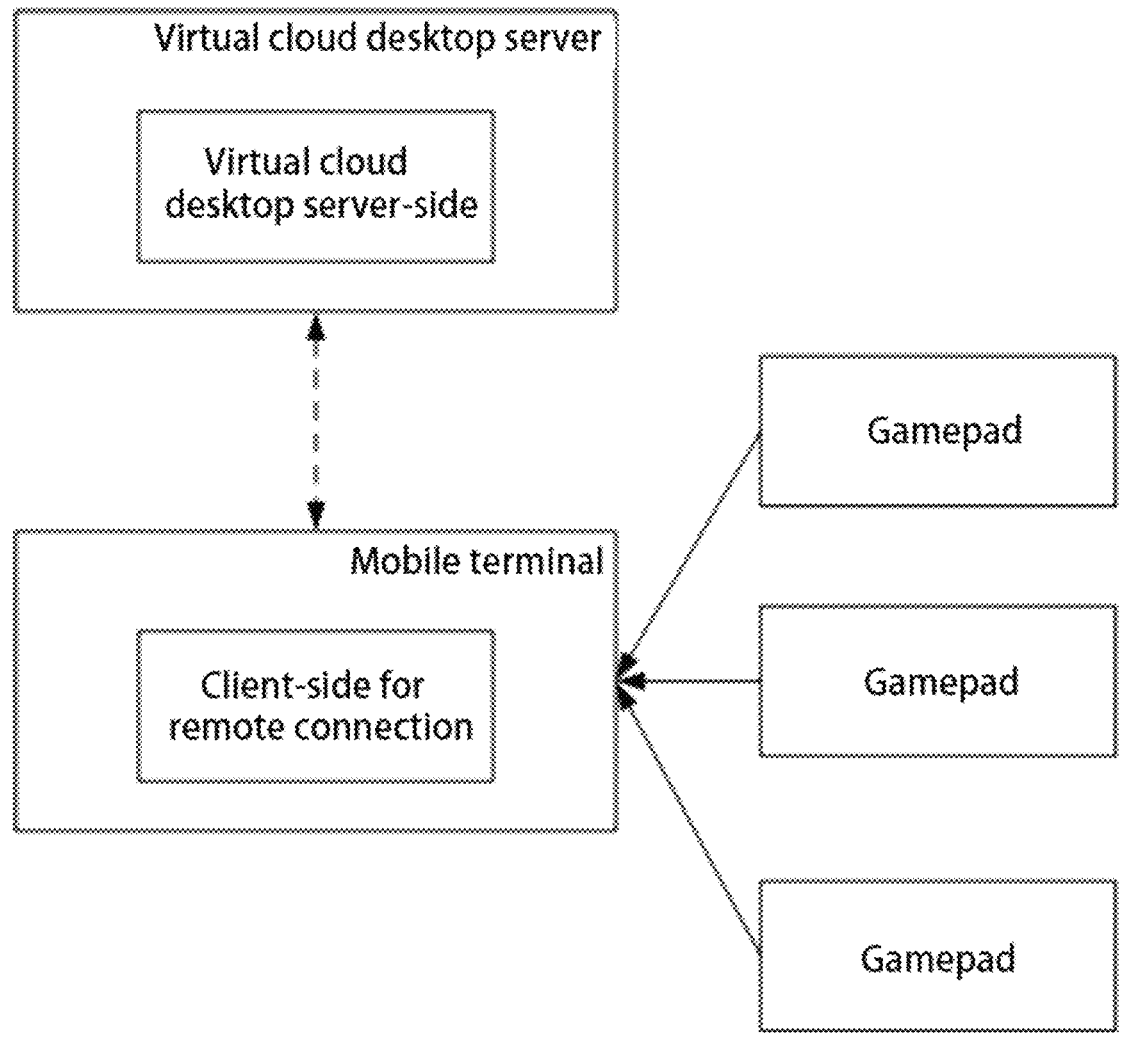
FIG. 1 shows an architecture diagram of a system for remote control of computer game by a gamepad according to an embodiment of the present disclosure.

Referring to FIG. 1, this embodiment provides a system for remote control of computer game by a gamepad. The system includes: a mobile terminal (such as a smartphone, tablet computer, smart wearable device, etc.), a virtual cloud desktop server (such as a physical server, cloud server, server group, etc. that provide virtual cloud desktop services), and at least one gamepad (such as wireless gamepad, wired gamepad, etc.). The mobile terminal is installed with a client-side software for remote connection, the virtual cloud desktop server is installed with a virtual cloud desktop server-side software, and the client-side software and the server-side software are remotely connected through the network, and transmit data based on the wide area network (WAN).

Figure 2:
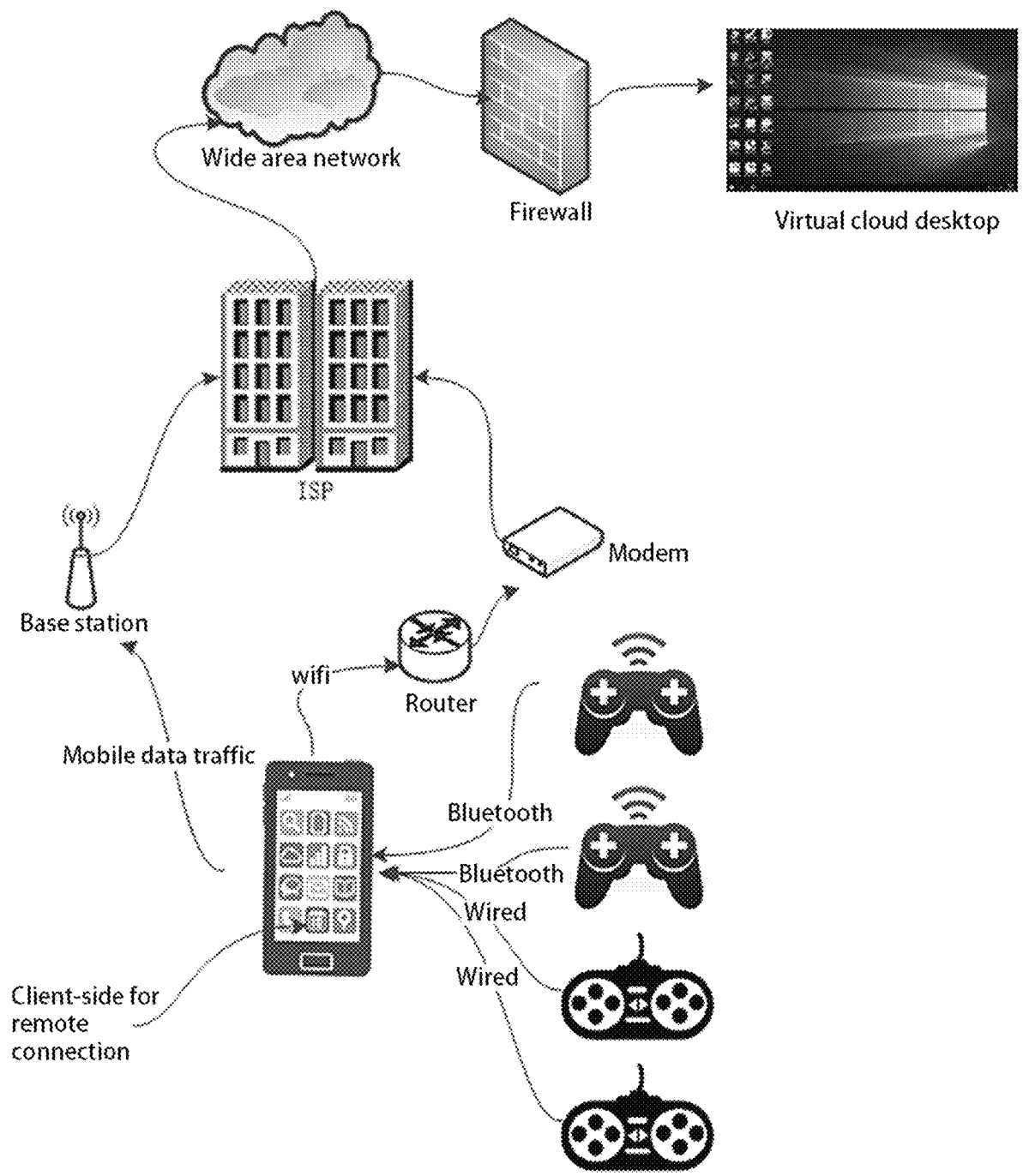
FIG. 2 shows an architecture diagram of a system for remote control of computer game by a gamepad according to another embodiment of the present disclosure.

Referring to FIG. 2, an exemplary system for remote control of computer game by a gamepad is shown. When the user connects the gamepad to the mobile terminal through a wired or wireless (such as bluetooth, WIFI, etc.) protocol, the remote connection client-side transmits the operation instruction data sent by the gamepad to the virtual cloud desktop server-side via WIFI or mobile data traffic. In detail, if the user chooses to connect to the network via WIFI, the gamepad data accesses the WAN after passing through the router, modem, and internet service provider (ISP). If the user chooses to connect to the network via mobile data traffic, the gamepad data accesses the WAN after passing through the base station and then the internet service provider (ISP). Finally, the gamepad data transmitted through the WAN passes through the firewall and enters the virtual cloud desktop server-side.

In view of the fact that remotely accessing a computer game through a mobile terminal needs to use a peripheral physical keyboard and mouse for controlling. For those who are accustomed to playing computer games with a gamepad, they cannot get the same excellent experience on a mobile terminal as playing a computer game with a gamepad. Therefore, the present embodiment designs the following method to make up for this shortage.

Figure 3:
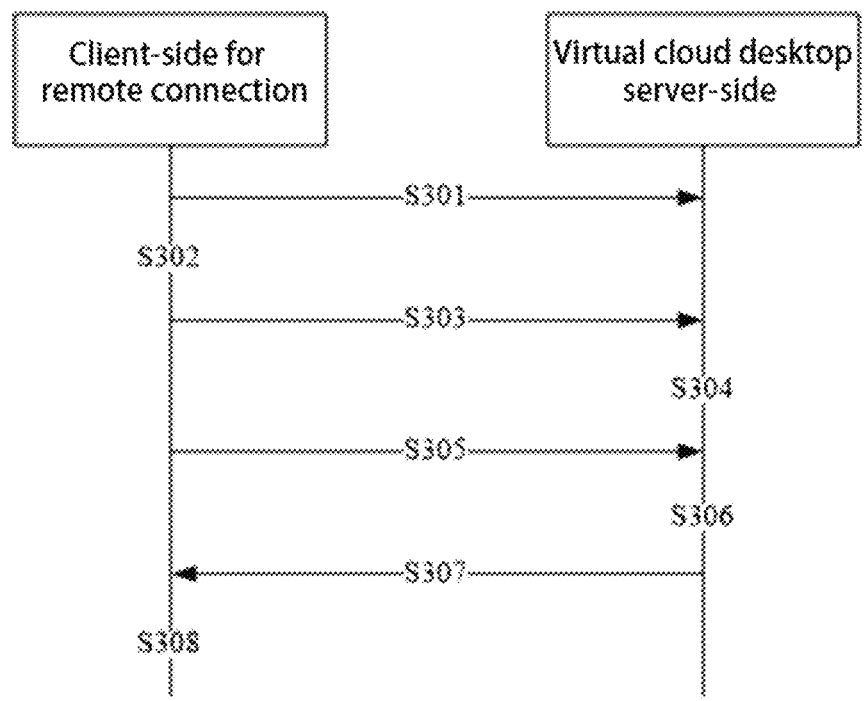
FIG. 3 shows a flow chart of a method for remote control of computer game by a gamepad according to an embodiment of the present disclosure.

Referring to FIG. 3, the method for remote control of computer game by a gamepad in this embodiment includes the following steps:

S301: The remote connection client-side is connected with the virtual cloud desktop server-side, so as to remotely access the virtual cloud desktop provided by the virtual cloud desktop server-side. The virtual cloud desktop includes a display window of a computer game.

S302: The remote connection client-side detects whether a gamepad connected with a mobile terminal. If yes, performing step S303.

S303: The remote connection client-side sends a message to the virtual cloud desktop server-side. The message includes the number of connected gamepad.

S304: When receiving a message, the virtual cloud desktop server-side creates or enables a corresponding number of virtual game devices. The virtual game device stores a one-to-one corresponding relationship between the button operation instructions of the physical gamepads and the KeyCode value of the operating system of the virtual cloud desktop server, and a one-to-one corresponding relationship between the joystick operation instructions of the physical gamepads and the KeyCode value of the operating system of the virtual cloud desktop server.

Steps S302 to S304 are specifically described hereinafter.

After the gamepad is connected to the mobile terminal, the client-side for remote connection of the mobile terminal detects whether there are gamepads being connected, and the detection includes the number N of gamepads connected, N>=1; then, the client-side for remote connection sends a message containing N to the virtual cloud desktop server-side.

After receiving the message, the virtual cloud desktop server-side creates and enables N virtual game devices in the operating system (virtual OS) of the virtual cloud desktop server. Alternatively, the virtual desktop infrastructure (VDI) layer creates multiple virtual game devices in advance and set them to be disabled, the virtual cloud desktop server-side enables N virtual game devices after receiving the message.

It is worth noting that each of the N virtual game devices is in a one-to-one corresponding relationship with the N connected gamepads. If the remote end is a physical PC instead of the virtual cloud desktop server used in this embodiment, the system would not have the feature of the VDI layer. Therefore, physical hardware devices cannot be simulated, the virtual game devices cannot be created at the VDI layer in advance.

S305: The client-side for remote connection captures the operation instruction data of each gamepad, and send them to the virtual cloud desktop server-side. The operation instruction data includes: the identity of the gamepad that the user is currently operating, the operation instruction data generated when the user operates the button and the operation instruction data generated when the user operates the joystick (including the relative movement value of the joystick).

S306: The virtual cloud desktop server-side receives each operation instruction data, and causes each virtual game device to output a KeyCode value corresponding to each button operation instruction and each joystick operation instruction according to the corresponding relationship, such that the virtual cloud desktop server executes the computer game according to each KeyCode value and the relative movement value of the joystick.

Herein, steps S305 to S306 are specifically described:

First, the client-side for remote connection processes the captured data into the data in the format required by the virtual cloud desktop server-side. Second, the client-side for remote connection packages the processed gamepad operation data and sends them to the virtual cloud desktop server-side. Third, the virtual cloud desktop server-side parses the data packet sent by the client-side for remote connection when receiving it, and sends the parse result to the virtual game devices created or enabled by the virtual cloud desktop server-side; each virtual game device searches in the corresponding relationship according to the parse content of the gamepad corresponding to itself in the parse result, and outputs the corresponding KeyCode. Finally, the virtual cloud desktop server runs the computer game based on these KeyCode values and the received relative movement value of the joystick, such that the operation of the gamepad is converted into the operation of remote computer games.

S307: The virtual cloud desktop server-side sends data of the running results of the computer game on the virtual cloud desktop to the client-side for remote connection.

Following the above, the virtual cloud desktop server displays the running result on the game display window of the virtual cloud desktop after executing the gamepad operation instructions, that is, the running result of the user controlling computer game by the gamepads is displayed on the virtual cloud desktop. After capturing the running results of the computer game of the virtual cloud desktop server, the virtual cloud desktop server-side encodes the data of all the displayed contents on the virtual cloud desktop (including the audio and video parts on the virtual cloud desktop) and sends them to the client-side for remote connection for displaying after being decoded and rendered. Of course, in order to save resources, if there are no changes on the virtual cloud desktop other than the game display window, only the display content data of the game display window is sent to the client-side for remote connection, such that the client-side for remote connection updates the display content of the game display window while continuing to display the desktop other than the original game display window.

S308: The client-side for remote connection receives the data and displays them on the mobile terminal.

Following the above, after the client-side receives the data, the display content of the virtual cloud desktop is displayed on the mobile terminal. Specifically, the client-side for remote connection displays the received data on the mobile terminal after rendering and decoding for feedback to the user.

All or part of the operations to implement the various method embodiments described above may be accomplished by hardware associated with a computer program. Based on this understanding, the present disclosure further provides a computer program product including one or more computer instructions. The computer command may be stored in a computer readable storage medium. The computer readable storage medium may be any available medium that can be stored by a computer, or may be a data storage device such as a server, a data center, and the like that integrates one or more available medium. The available medium may be a magnetic medium (such as a floppy disk, a hard disk, a magnetic tape), an optical medium (such as a DVD), or a semiconductor medium (such as a solid state disk (SSD)).

Figure 4:
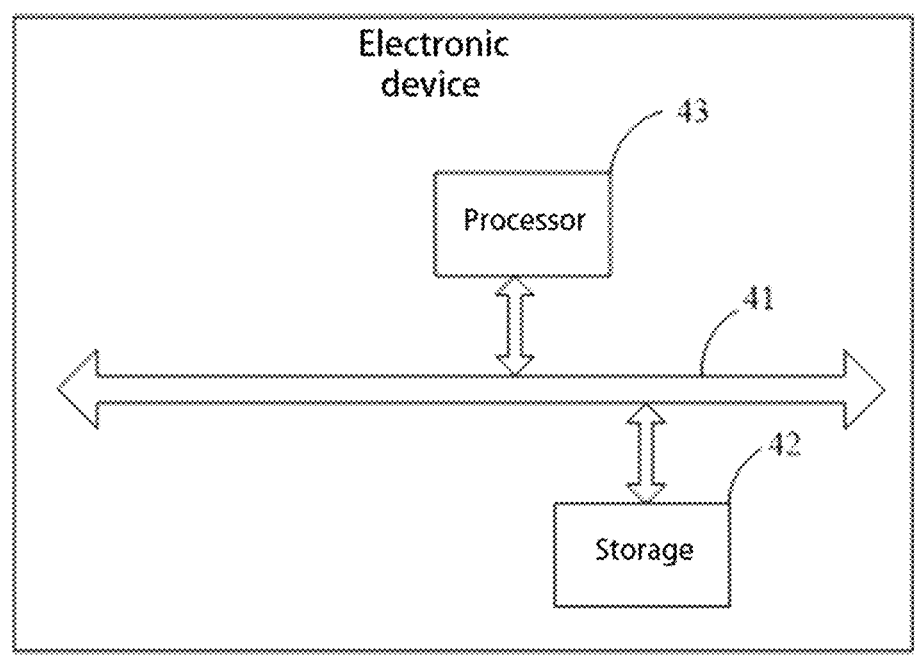
FIG. 4 is a schematic diagram showing the structure of an electronic device according to an embodiment of the present disclosure.

Referring to FIG. 4, this embodiment provides an electronic device, which may be a desktop computer, a portable computer, a smart phone, a physical server, a cloud server, or the like. In detail, the electronic device at least includes a storage 42 and a processor 43 connected through the bus 41. The storage 42 stores a computer program, and the processor 43 executes the computer program stored in the storage 42, so as to execute all or part of the steps performed by the virtual cloud desktop server-side in the aforementioned method embodiment.

The system bus mentioned above may be a peripheral component interconnect (PCI) bus or an extended industry standard architecture (EISA) bus, etc. The system bus can be divided into address bus, data bus, and control bus and so on. For convenience of representation, only a thick line is used in the figure, but it does not mean that there is only one bus or one type of bus. The communication interface is used to implement communication between the database access device and other devices (such as a client-side, a read-write library, and a read-only library). The storage may include non-volatile memory, such as at least one disk memory.

The above processor may be a general processor, including a central processing unit (CPU), a network processor (NP), etc.; it may also be a digital signal processing (DSP), application specific integrated circuit (ASIC), field programmable gate array (FPGA) or other programmable logic devices, discrete gate or transistor logic devices, discrete hardware components.

In summary, the present disclosure provides a method, system and electronic device for remote control of computer game by a gamepad, which enables a mobile terminal user to use a gamepad to remotely control a computer game on the mobile terminal, and obtain the excellent playing experience same as using a gamepad to directly control computer games. Therefore, the present disclosure effectively overcomes various shortcomings in the existing technology and has high industrial utilization value.

The above-described embodiments are merely illustrative of the principles of the disclosure and its effects, and are not intended to limit the disclosure. Modifications or variations of the above-described embodiments may be made by those skilled in the art without departing from the spirit and scope of the disclosure. Therefore, all equivalent modifications or changes made by those skilled in the art without departing from the spirit and scope of the disclosure will be covered by the appended claims.

The invention claimed is:

1. A method for remote control of computer games by a gamepad, comprising:

remotely connecting a client-side for remote connection of a mobile terminal with a virtual cloud desktop server-side of a virtual cloud desktop server, so as to remotely access a virtual cloud desktop provided by the virtual cloud desktop server-side, wherein the virtual cloud desktop comprises a display window of a computer game;

detecting, by the client-side for remote connection, whether a gamepad is connected with the mobile terminal; if yes, sending a message to the virtual cloud desktop server-side, wherein the message comprises a number of connected gamepads;

creating or enabling, by the virtual cloud desktop server-side, a corresponding number of virtual game devices when receiving the message, wherein the virtual game device stores a one-to-one corresponding relationship between a button operation instruction of a physical gamepad and a KeyCode value of an operating system of the virtual cloud desktop server, and a one-to-one corresponding relationship between a joystick operation instruction of a physical gamepad and a KeyCode value of the operating system of the virtual cloud desktop server;

capturing, by the client-side for remote connection, operation instruction data of each of the gamepads, and sending the operation instruction data to the virtual cloud desktop server-side, wherein the operation instruction data comprises an identity of the gamepad, button operation instruction data and joystick operation instruction data;

receiving, by the virtual cloud desktop server-side, the operation instruction data, and causing each virtual game device to output a KeyCode value corresponding to each button operation instruction and each joystick operation instruction according to the corresponding relationship, such that the virtual cloud desktop server runs the computer game according to each KeyCode value and a relative movement value of a joystick in the joystick operation instruction data;

sending, by the virtual cloud desktop server-side, data of a running result of the computer game on the virtual cloud desktop to the client-side for remote connection;

receiving the data by the client-side for remote connection, and displaying the data on the mobile terminal.

2. The method according to claim 1, wherein the virtual cloud desktop server-side creating a corresponding number of virtual game devices when receiving the message comprises: the virtual cloud desktop server-side creates and enables a corresponding number of virtual game devices in an operating system of the virtual cloud desktop server.

3. The method according to claim 1, wherein the virtual cloud desktop server-side enabling a corresponding number of virtual game devices when receiving the message comprises:

pre-creating a plurality of virtual game devices by the virtual cloud desktop server-side in a VDI layer of the virtual cloud desktop server, and setting the virtual game devices to be disabled;

after receiving the message, enabling, by the virtual cloud desktop server-side, a corresponding number of virtual game devices according to the number of connected gamepads.

4. The method according to claim 1, further comprises:

after capturing the operation instruction data of each of the gamepads, converting, by the client-side for the remote connection, the operation instruction data into data in a format required by the virtual cloud desktop server-side, and packaging and sending the converted data to the virtual cloud desktop server-side;

receiving and parsing, by the virtual cloud desktop server-side, a data packet sent by the client-side for remote connection, and sending a parse result to each of the virtual game devices that are created or enabled.

5. The method according to claim 1, wherein the client-side for remote connection sends captured operation instruction data of each of the gamepads to the virtual cloud desktop server-side via a wide area network.

6. A system for remote control of computer game by a gamepad, comprising: a mobile terminal having a client-side for remote connection, a virtual cloud desktop server having a virtual cloud desktop server-side, and at least one gamepad; wherein the client-side for remote connection is remotely connected with the virtual cloud desktop server-side, so as to remotely access a virtual cloud desktop provided by the virtual cloud desktop server-side, the virtual cloud desktop comprises a display window of a computer game;

the client-side for remote connection detects whether a gamepad is connected with the mobile terminal, if yes, sends a message to the virtual cloud desktop server-side, the message comprises a number of connected gamepads; the client-side for remote connection captures operation instruction data of each of the gamepads, and sends the operation instruction data to the virtual cloud desktop server-side, the operation instruction data comprises an identity of the gamepad, button operation instruction data and joystick operation instruction data;

the virtual cloud desktop server-side creates or enables a corresponding number of virtual game devices when receiving the message, the virtual game device stores a one-to-one corresponding relationship between a button operation instruction of a physical gamepad and a KeyCode value of an operating system of the virtual cloud desktop server, and a one-to-one corresponding relationship between a joystick operation instruction of the physical gamepad and a KeyCode value of the operating system of the virtual cloud desktop server;

when receiving the operation instruction data, the virtual cloud desktop server-side causes each virtual game device to output a KeyCode value corresponding to each button operation instruction and each joystick operation instruction according to the corresponding relationship, such that the virtual cloud desktop server operates the computer game according to each KeyCode value and a relative movement value of a joystick in the joystick operation instruction data; the virtual cloud desktop server-side sends data of a running result of the computer game on the virtual cloud desktop to the client-side for remote connection, such that the client-side for remote connection receives the data and displays the data on the mobile terminal.

7. A method for remote control of computer games by a gamepad, applied to a virtual cloud desktop server-side, wherein the method comprises:

providing a virtual cloud desktop to the client-side when receiving a remote access request from a client-side, the virtual cloud desktop comprises a display window of a computer game;

creating or enabling a corresponding number of virtual game devices when receiving a message containing a number of connected gamepads sent by the client-side, wherein the virtual game device stores a one-to-one corresponding relationship between a button operation instruction of a physical gamepad and a KeyCode value of an operating system of a virtual cloud desktop server, and a one-to-one corresponding relationship between a joystick operation instruction of the physical gamepad and a KeyCode value of the operating system of the virtual cloud desktop server;

causing each virtual game device to output a KeyCode value corresponding to each button operation instruction and each joystick operation instruction according to the corresponding relationship when receiving operation instruction data of each of the gamepads captured and sent by the client-side, such that the virtual cloud desktop server runs the computer game according to each KeyCode value and a relative movement value of a joystick in the joystick operation instruction data;

sending data of a running result of the computer game on the virtual cloud desktop to the client-side, such that the client-side receives the data and displays the data.

8. The method according to claim 7, wherein the virtual cloud desktop server-side creating a corresponding number of virtual game devices when receiving the message comprises: the virtual cloud desktop server-side creates and enables a corresponding number of virtual game devices in an operating system of the virtual cloud desktop server;

the virtual cloud desktop server-side enabling a corresponding number of virtual game devices when receiving the message comprises: pre-creating, by the virtual cloud desktop server-side, a plurality of virtual game devices in a VDI layer of the virtual cloud desktop server, and setting the virtual game devices to be disabled; after receiving the message, enabling, by the virtual cloud desktop server-side, a corresponding number of virtual game devices according to the number of connected gamepads.

9. A storage medium, storing a computer program, wherein when the computer program is executed by a processor, a method for remote control of computer game by a gamepad is realized, wherein the method comprises:

providing a virtual cloud desktop to the client-side when receiving a remote access request from a client-side, the virtual cloud desktop comprises a display window of a computer game;

creating or enabling a corresponding number of virtual game devices when receiving a message containing a number of connected gamepads sent by the client-side, wherein the virtual game device stores a one-to-one corresponding relationship between a button operation instruction of a physical gamepad and a KeyCode value of an operating system of a virtual cloud desktop server, and a one-to-one corresponding relationship between a joystick operation instruction of the physical gamepad and a KeyCode value of the operating system of the virtual cloud desktop server;

causing each virtual game device to output a KeyCode value corresponding to each button operation instruction and each joystick operation instruction according to the corresponding relationship when receiving operation instruction data of each of the gamepads captured and sent by the client-side, such that the virtual cloud desktop server runs the computer game according to each KeyCode value and a relative movement value of a joystick in the joystick operation instruction data; and sending data of a running result of the computer game on the virtual cloud desktop to the client-side, such that the client-side receives the data and displays the data.

10. The storage medium according to claim 9, wherein the method further comprises:

the virtual cloud desktop server-side creating a corresponding number of virtual game devices when receiving the message comprises: the virtual cloud desktop server-side creates and enables a corresponding number of virtual game devices in an operating system of the virtual cloud desktop server; and the virtual cloud desktop server-side enabling a corresponding number of virtual game devices when receiving the message comprises: pre-creating, by the virtual cloud desktop server-side, a plurality of virtual game devices in a VDI layer of the virtual cloud desktop server, and setting the virtual game devices to be disabled; after receiving the message, enabling, by the virtual cloud desktop server-side, a corresponding number of virtual game devices according to the number of connected gamepads.

11. An electronic device, comprising: a processor and a storage; wherein, the storage stores a computer program;

the processor executes the computer program, such that the electronic device executes a method for remote control of computer game by a gamepad, wherein the method comprises:

providing a virtual cloud desktop to the client-side when receiving a remote access request from a client-side, the virtual cloud desktop comprises a display window of a computer game;

creating or enabling a corresponding number of virtual game devices when receiving a message containing a number of connected gamepads sent by the client-side, wherein the virtual game device stores a one-to-one corresponding relationship between a button operation instruction of a physical gamepad and a KeyCode value of an operating system of a virtual cloud desktop server, and a one-to-one corresponding relationship between a joystick operation instruction of the physical gamepad and a KeyCode value of the operating system of the virtual cloud desktop server;

causing each virtual game device to output a KeyCode value corresponding to each button operation instruction and each joystick operation instruction according to the corresponding relationship when receiving operation instruction data of each of the gamepads captured and sent by the client-side, such that the virtual cloud desktop server runs the computer game according to each KeyCode value and a relative movement value of a joystick in the joystick operation instruction data; and sending data of a running result of the computer game on the virtual cloud desktop to the client-side, such that the client-side receives the data and displays the data.

12. The electronic device according to claim 11, wherein the method further comprises:

the virtual cloud desktop server-side creating a corresponding number of virtual game devices when receiving the message comprises: the virtual cloud desktop server-side creates and enables a corresponding number of virtual game devices in an operating system of the virtual cloud desktop server; and the virtual cloud desktop server-side enabling a corresponding number of virtual game devices when receiving the message comprises: pre-creating, by the virtual cloud desktop server-side, a plurality of virtual game devices in a VDI layer of the virtual cloud desktop server, and setting the virtual game devices to be disabled; after receiving the message, enabling, by the virtual cloud desktop server-side, a corresponding number of virtual game devices according to the number of connected gamepads.

* * * * *